Oct. 13, 1931.  S. TONIETTI  1,827,178
RECORDING DEVICE
Filed July 8, 1929
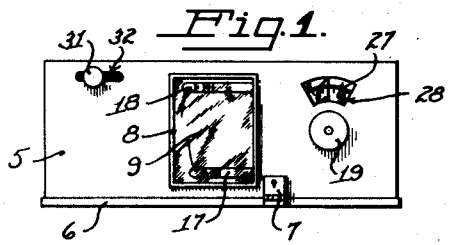
INVENTOR.
Simon Tonietti
BY Booth & Booth
ATTORNEYS.

Patented Oct. 13, 1931

1,827,178

UNITED STATES PATENT OFFICE

SIMON TONIETTI, OF COUGAR, CALIFORNIA

RECORDING DEVICE

Application filed July 8, 1929. Serial No. 376,716.

The present invention relates to recording devices, and more particularly to a device by which one or more measurements or values may be recorded, manually, upon a chart in such a manner that errors are minimized and subsequent alteration is rendered practically impossible.

The principal object of the invention is to provide a manually operated mechanical device by which one or more known measurements or values may be quickly and accurately recorded upon a blank chart. A second object is to minimize inaccuracies due to conscious or unconscious errors on the part of the operator. Another object is to make it practically impossible to alter the record after having been made. A still further object is to provide means for holding and periodically advancing a strip or ribbon of paper or other suitable material, so that a great number of successive values can be recorded.

These and other objects and advantages of the invention will be apparent from the following specification, which should be read with the understanding that the form, construction and arrangement of the several parts may be varied, within the limits of the claims hereto appended, without departing from the spirit of the invention as set forth therein.

In the drawings,

Fig. 1 is an external plan view of my recording device, reduced in size.

Fig. 2 is a sectional plan taken with the top of the casing removed.

Fig. 3 is a section taken on the line 3—3 of Fig. 2.

Fig. 4 is an enlarged detail of the strip feeding and marking rolls.

Referring more particularly to the drawings, the reference numeral 5 designates a box or casing inclosing the entire device. One side 6 is formed as a cover or door, and is preferably provided with a suitable lock indicated at 7, so that access to the interior mechanism can be had only by authorized persons.

The top of the box has a glass covered window 8, through which is visible a portion of a blank strip of paper 9, carried upon spools 10 and 11. The visible portion of said strip passes over a fixed platen 12. The measurements or values to be recorded are marked upon the strip, as oppositely disposed transverse arcs 13 and 14, by means of styli 15 and 16 carried by horizontally swinging arms 17 and 18, the length of said arcs being proportioned to said values.

The stylus arms 17 and 18 are operated selectively by a knob 19 carried upon a rotatable shaft 20 extending through the top of the case. The arms are freely pivoted upon a spindle 21 upon which is also mounted a spider 22 having pins 23 and 24 respectively, engaging said arms. The spider is rocked, horizontally, by a rack 25 and a pinion 26, the latter fixed upon the operating shaft 20. An indicating disk 27 is also fixed upon said shaft, and has a suitable scale 27' visible through a window 28 in the top of the case.

It will be seen that rotation of the knob 19 and shaft 20 from its neutral position as shown, rocks the spider 22 in one direction or the other, according to the direction of rotation of the knob, and thereby swings one or the other of the arms 17 and 18 inwardly, causing its stylus to draw an arc on the strip. Springs 29 return said arms to their outward or normal position, thereby also returning the shaft 20 and its disk 27 to their normal central position. The scale 27' upon said disk is preferably calibrated to read in terms of the measurements or values to be recorded, so that the operator, by turning the knob 19 to the right, for example, until the scale mark indicating the known value coincides with a pointer or indicating mark 30 adjacent to the disk, causes the arm 17 to draw an arc 13 of corresponding length, and then by turning said knob to the left until the scale 27' indicates the second known value, causes the arm 18 to draw a second and opposite arc 14 corresponding thereto. The arms 17 and 18 are of slightly different lengths, so that the arcs drawn thereby do not overlap. Thus two separate values can be recorded without moving the strip 9, merely by turning the knob 19 first one way and then the other to the proper points as indicated by the scale 27'.

The strip 9 is advanced, toward the left as seen in the drawings, to bring a fresh portion beneath the styli, by a knob 31 projecting through a slot 32 in the top of the case. The knob 31 is secured upon a slide 33, operating in a suitable horizontal guide 34, and connected by a link 35 with a vertical lever 36, the latter being pivoted at 37. This lever carries a pawl 38, held by a spring 39 in operative contact with a ratchet 40 secured upon the shaft of the spool 10. Reciprocating movement of the lever 36, produced by operating the slide knob 31, therefore rotates the spool 10 and winds the strip thereupon.

After the strip 9 leaves the platen 12, it passes between a pair of rolls 41 and 42, one of which is provided with a ratchet 43 operated by a pawl 44 connected with the lever 36. The roll 41 is thus positively rotated by the movement of said lever, to assist in advancing the strip. The pawls 38 and 44 are best formed as bars provided with a plurality of ratchet teeth, as shown.

The rolls 41 and 42 are provided with means for making longitudinal parallel marks or lines upon the strip. Any suitable means may be used for this purpose, but I prefer to form such longitudinal marks as creases in the strip, by providing the lower roll 42 with a hard surface having a number of circumferential ridges 45 (Fig. 4). The upper roll is formed of suitably resilient material, permitting the formation of creases 46 in the strip 9 by said ridges.

The purpose of the marks or creases 46 is to provide gauge lines for measuring the lengths of the previously inscribed arcs 13 and 14, and it is intended that the spacing of the ridges 45 (which determines the spacing of said lines) shall be suitably correlated to the scale upon the disk 27, so that the lengths of the arcs 13 and 14, as indicated by the gauge lines 46, will provide an accurate and easily readable record of the measurements or values to which said disk is set.

By inscribing the gauge lines 46 upon the strip after the inscription of the arcs 13 and 14, errors in the record due to conscious or unconscious acts of the operator, are minimized, because said record is not complete until after it has passed out of view. Inaccuracy in the record due to variations in the width or lateral position of the strip is also eliminated, because the position of the inscribing roll 42 is fixed with relation to the range of movement of the stylus arms 17 and 18.

The operation of the device will be apparent. Let it be supposed that a series of pairs of measurements or values are to be recorded. As the first pair of values is presented to the operator, he turns the knob 19 in one direction, say to the right, until the scale 27' indicates the first of his pair of values, thus inscribing the arc 13 upon the blank strip, the length of said arc corresponding to said value. He then turns the knob 19 to the left, past its normal or zero position, to a position (indicated by the scale 27') corresponding to the second of his pair of values, thus inscribing the arc 14 whose length corresponds to said second value. Returning the knob 19 to zero, the operator then slides the knob 31 to the right, thereby advancing the strip 9 and superposing the gauge lines 46 upon the previously inscribed arcs 13 and 14. The record of the first pair of values is now complete. A spring 47 returns the slide 33 and its associated mechanism to normal position, and the operation is repeated for the second and subsequent pairs of values.

Obviously, the device may be used to record single values of any nature or a series thereof. It is especially suitable, however, for recording a series of values, either singly or in pairs, in cases where the range of variation throughout the entire series is comparatively small.

I claim:—

1. A recording device comprising means for holding a blank; a pair of movable styli adapted to inscribe separate marks thereupon corresponding to values to be recorded; a member adapted to operate said styli selectively according to the direction of its movement; and means for indicating the extent of said movement.

2. A recording device comprising means for holding a blank; a pair of movable styli adapted to inscribe separate marks thereupon corresponding to values to be recorded; a rotatable member adapted to selectively operate said styli according to the direction of its rotation; and means for indicating the rotative position of said member.

In testimony whereof I have signed my name to this specification.

SIMON TONIETTI.